United States Patent [19]

Takada

[11] 4,219,236
[45] Aug. 26, 1980

[54] BELT CARRIED AUTOMATIC LOCKING RETRACTOR

[75] Inventor: Juichiro Takada, Tokyo, Japan

[73] Assignee: Takata Kojyo Co., Ltd., Tokyo, Japan

[21] Appl. No.: 25,626

[22] Filed: Mar. 30, 1979

Related U.S. Application Data

[63] Continuation-in-part of Ser. No. 852,121, Nov. 16, 1977, Pat. No. 4,152,026.

[30] Foreign Application Priority Data

Dec. 13, 1976 [JP] Japan .......................... 51-165906[U]

[51] Int. Cl.³ ....................... A62B 35/00; B65H 75/48
[52] U.S. Cl. .................................. 297/476; 24/171; 24/196; 242/107.2; 297/479
[58] Field of Search ................. 297/476, 475, 479; 24/170, 171, 77 R, 196; 280/807; 242/107.2, 107.1, 107, 107.12

[56] References Cited

U.S. PATENT DOCUMENTS

| | | | |
|---|---|---|---|
| 3,227,489 | 1/1966 | Stubblefield | 24/196 X |
| 3,246,929 | 4/1966 | Taggart | 242/107.2 |
| 3,249,386 | 5/1966 | Board | 24/196 X |
| 3,409,949 | 11/1968 | Kobrehel et al. | 297/476 X |
| 3,711,904 | 1/1973 | Gavagan | 24/230 AK |
| 3,913,977 | 10/1975 | Takada | 297/476 |
| 3,927,912 | 12/1975 | Takada | 24/170 X |
| 4,152,026 | 5/1979 | Takada | 24/171 X |

Primary Examiner—James T. McCall
Attorney, Agent, or Firm—Wolder, Gross & Yavner

[57] ABSTRACT

An automatic locking belt carried safety belt take-up reel includes a U-shaped body member provided with longitudinal side arms having a spring biased belt take-up reel journalled between its rear portions and having parallel track grooves formed in the confronting faces of its front portion. A tongue plate slidably engages the grooves and has a transverse rear and a lock bar slidably rests on the tongue plate across the slot and includes upwardly forwardly projecting side legs. A top wall extends between the top forward portions of the side arms and terminates in a front depending lip extending to the level of the groove tops. A safety belt has one end connected to the reel and extends from the bottom thereof upwardly through the slot rearward of the lock bar, about the lock bar and then downwardly between the lock bar and the slot front edge and rearwardly to a vehicle anchor point.

10 Claims, 5 Drawing Figures

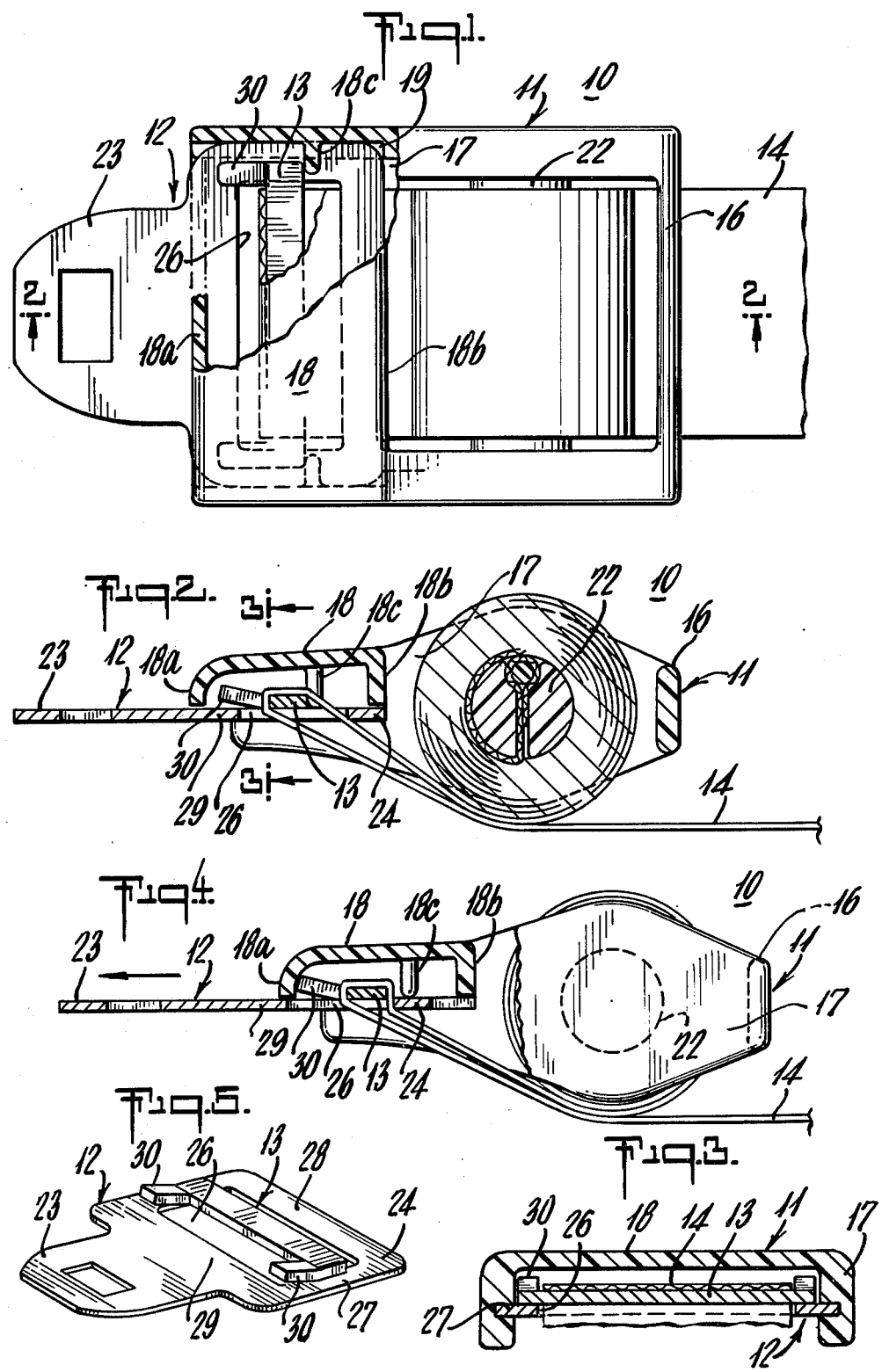

BELT CARRIED AUTOMATIC LOCKING RETRACTOR

The present application is a Continuation-In-Part of co-pending application Ser. No. 852,121 filed Nov. 16, 1977 and maturing as U.S. Pat. No. 4,152,026 issued May 1, 1979.

BACKGROUND OF THE INVENTION

The present invention relates generally to improvements in safety belt retractor devices and it relates more particularly to an improved automatic locking belt retractor reel of the belt carried type.

There are generally two broad types of automatic locking safety belt retractor reels which are widely employed, one in which the reel device is anchored directly to the vehicle body and the other in which the reel device is carried by the free end of the safety belt, the opposite end of the belt being anchored to the vehicle. While the vehicle mounted type of safety belt reel has many advantages, it possesses an important drawback in that being of relatively large size or bulk, it cannot be installed in many vehicles because of the lack of sufficient space and as a consequence, retrator reel devices of the second type must be used. However, while many forms of automatic locking belt carried retractor wheels have been heretofore, proposed, they leave much to be desired. Typical of such retractor reels is that described in U.S. Pat. No. 3,227,489 to Stubblefield in which an articulated body member includes a buckle coupling tongue section and a retractor wheel mounting section which are swingably pivoted to each other, the locking and unlocking of the belt being responsive to the angular relationship of the two sections. This latter type of reel is complex, expensive and often unreliable and inconvenient and awkward to apply and use.

SUMMARY OF THE INVENTION

It is a principal object of the present invention to provide an improved safety belt retractor device.

Another object of the present invention is to provide an improved automatic locking safety belt retractor device.

Still another object of the present invention is to provide an improved automatic locking safety belt retractor device of the belt carried type.

A further object of the present invention is to provide an improved safety belt carried device which functions as a belt coupling unit and as a belt take-up reel.

Still a further object of the present invention is to provide a coupling tongue mounted, belt carried belt retractor device which is automatically locked in response to the linear or translational movement of the tongue away from the belt rewind reel.

Another object of the present invention is to provide an improved device of the above nature characterized by its simplicity, compactness, ruggedness, reliability, low cost, ease of manufacture and assembly, ease and convenience of operation and application, and great versatility and adaptability.

The above and other objects of the present invention will become apparent from a reading of the following description taken in conjunction with the accompanying drawings which illustrate a preferred embodiment thereof.

The improved automatic locking belt carried belt retractor device in accordance with the present invention comprises a body member including transversely spaced longitudinally extending side walls, a spring biased belt retractor reel supported between the rear portions of the side walls, a coupling member supported between and projecting forwardly of the forward portions of the side walls and restricted to only longitudinal movement and having in its rear portion a transverse slot, a lock bar in longitudinal slidable registry with the slot extending between the side walls and restricted in its forward longitudinal movement to a predetermined position and a belt extending forwardly from the reel along its bottom through the slot rearwardly of the lock bar, forwardly about the lock bar, downwardly through the slot forward of the lock bar and then rearwardly to a belt anchor point.

In the preferred structure, parallel longitudinal guide grooves are formed in the confronting faces of the side wall forward portions and a top wall extends between the top edges of the side wall front portions and terminates at its front and rear in depending flanges extending to the level of the tops of the grooves. The coupling member is a flat coupling tongue whose rear portion slidably engages the grooves and whose rearward movement is limited by the ends of the grooves and the lock bar is a flat strip resting on the tongue across the slot and terminating in forwardly upwardly projecting end legs whose longitudinal path is intercepted by the top wall front flange.

The improved device is of simple, rugged and inexpensive construction and of reliable and easy operation. In operation, a pull on the coupling member to move it forwardly, effects the contraction between the locking bar and the slot rear edge to clamp the belt therebetween and prevent belt withdrawal, whereas release of the coupling member permits the separation of the locking bar and slot rear edge and the movement of the belt therebetween to permit its withdrawal from the reel.

BRIEF DESCRIPTION OF THE DRAWINGS

FIG. 1 is a partially fragmented top plan view of a belt retractor reel device embodying the present invention, the device being shown in a belt release condition;

FIG. 2 is a sectional view taken along line 2—2 in FIG. 1;

FIG. 3 is a sectional view taken along line 3—3 in FIG. 2;

FIG. 4 is a partially fragmented front view of the device illustrated in a belt locked condition; and FIG. 5 is a perspective view of the coupling member and locking bar of the illustrated device.

DESCRIPTION OF THE PEFERRED EMBODIMENT

Referring now to the drawings which illustrate a preferred embodiment of the present invention, the reference numeral 10 generally designates the improved belt carried or mounted automatic locking belt retractor device which includes a main body member 11, a tongue member 12 and a locking bar 13. The retractor device 10 is carried by the inner end of a belt 14, the outer end of which is anchored in a suitable manner at one side of a vehicle seat or other desirable position. A suitable buckle or coupling device, now shown, for releasably engaging the coupling tongue member 12, is anchored either directly or by way of a connector member to the opposite side of the seat.

The body member 11 is advantageously integrally formed of a suitable synthetic organic polymeric resin and is of U-shaped configuration including a rear cross wall or cross-piece 16 and forwardly longitudinally projecting parallel side walls or arms 17 the upper forward portions of which are joined by a reinforcing top cross wall 18 terminating at its front and rear in depending front and rear flanges 18a and 18b respectively. Formed in the confronting faces of the forward end portions of side arms 17 are parallel coplanar longitudinal track or guide grooves 19 which extend rearwardly from the side arm front ends to the rear face of rear flange 18b, the flanges terminating at a level immediately above grooves 19.

A reel or spindle is disposed between cross member 16 and rear flange 18b and extends between and is suitably journalled to the side arms 17 so as to be rotatable in opposite counterclockwise belt retraction and clockwise belt extraction directions as viewed in FIGS. 2 and 4. At least one coiled spiral wind-up spring of known construction is connected between reel 22 and a side arm 17 and is housed in a corresponding hollow rear portion of a side arm 17 and biases the reel 22 to rotate in a belt retraction direction and is loaded with the belt extraction rotation of the reel. The inner end of the belt 14 is secured to the reel 22 so as to be retracted with the counterclockwise rotation of the reel.

The tongue member 12 is in the form of a flat plate and includes a rectangularly apertured front buckle coupling tongue portion 23 and a transversely enlarged rear head portion 24 whose outer lateral borders slidably engage respective track grooves 19, the tongue portion 23 projecting forwardly of body member side arms 17. Formed in the rear head portion 24 is a transversely extending rectangular slot or opening 26 which extends to points inwardly of the respective confronting faces of side arms 17 and is delineated by side end borders or frame legs 27, rear border or frame leg 28 and front border or frame leg 29.

The locking bar 13 is relatively flat and extends transversely across and registers with the opening 26 and terminates in end portions which slidably rest on the top faces of opening side borders 27, the longitudinal dimension of locking bar 13 being less than that of opening 26. Projecting forwardly from the side ends of the front face of locking bar 13 are upwardly forwardly inclined legs 30 which terminate at a level between the top and bottom of front flange 18a. Vertical ribs 18c are formed on the inside faces of side arms 17 between flanges 18a and 18b and with flange 18a limiting the forward and rearward movement respectively of locking bar 13, alternatively engaging legs 30 or the side rear ends of locking bar 13. The legs 30 cooperate with flange 18a which defines a stop for the forward movement of legs 30 to limit the forward movement of the locking bar 13 relative to the body member 11.

The belt 14 extends forwardly from the bottom rear portion of the belt thereof, wound on the reel 22 upwardly through the space between the proximate rear edge of locking bar 13 and rear frame leg 28, and then forwardly around along the top face of locking bar 13 and downwardly through the space between the front edge of locking bar 13 and frame leg 29 and thence rearwardly below the forwardly extending portion of belt 14 to the anchor point at the belt outer end. The belt 14 extends approximately 180° about the locking bar 13.

In the operation of the retractor device 10 described above, when the device is not being used, the tongue member 12 and the reel carrying body member 11 are united as a unit by the reinforcing power or pull of belt 14 effected by reel 22, the locking of belt 14 with any pull on tongue member 12 and the limitation of the forward movement of locking bar 13, and remains as it is. When the united tongue and body members are to be extracted in order to engage a complementary buckle, the body member 11 is manually gripped at the walls 17 of the body member and pulled toward the mating buckle to be engaged therewith, the pull aided by ribs 18c acting to urge locking bar 13 forwardly relative to slot 26 overcoming the retarding force of the lock bar 13 to permit the withdrawal of the belt 14 smoothly from the belt reel 22 and finally to a buckle tongue engaging position. It should be noted that as the body member 11 is pulled to unwind the belt, the tongue member 12 not being pulled is free to be and is fully retracted and the space between lock bar 13 and rear frame leg 28 is opened to permit the passage of belt 14 through this space, such passage being permitted even when the body member is not pulled as long as the tongue member 12 is not moved forwardly of the body member 11.

Completion of the engagement of the tongue member 12 by the vehicle anchored complementary buckle effects the relative forward advance of tongue member 12 with the relative movement of the lock bar 13 rearwardly toward the tongue member rear frame leg 28, being so motivated by the belt take-up force and the forward movement of tongue member 12 relative to body member 11 thereby resulting in the gripping of the belt securely and powerfully between the lock bar edge and the inside or rear edge of the tongue member rear frame leg 28 to effect the automatic locking of the belt and prevent withdrawal thereof. Moreover, the force of the forward movement of the tongue member 12 relative to the body member 11 and the sliding relative rearward motion of the lock bar 13 are greatly enhanced as a consequence to the pull on the belt by the occupant restrained by the belt following the withdrawal of the belt to occupant's body size, particularly with any forward movement of the occupant which further increases the belt locking force which is transmitted directly through the tongue member 13 and belt 14 to the belt anchor.

Upon the manual selective disengagement of the tongue member 12 from the associated buckle, the take-up force by the reel 22 of the belt effects the belt winding and the smooth operation thereof is continued by reason of the multiple contribution of both the sliding movement of the tongue member 12 and lock bar 13.

As explained above, in the improved device 10, the relatively free motion between the body member 11 and the tongue member 12 as effected by the take-up driving force of the belt 14 is achieved, since these members are slidably associated by reason of the side edges of tongue member 12 slidably engaging longitudinal grooves 19. Furthermore, the lock bar 13 is also arranged so as to be freely slidable relative to the rear portion 24 of the tongue member 12 and to be movable forwardly and rearwardly within a restricted range in the body member 11. Each of these members can be manufactured independently of each other and the assembly thereof is simple, without any mutual interference or adverse effect. Moreover, a high interchangeability of parts is positively achieved which is of great advantage and permits low cost mass production.

The contributions of both sliding motions of two members makes possible the extraction and retraction of the belt smoothly and without any appreciable resistance. A further advantage which is realized is that no relative rotational motion between parts is required for operation as in the earlier type retractor (U.S. Pat. No. 3,927,912). Accordingly, an occupant here can engage and disengage the buckle while his body moves forwardly and rearwardly and this contributes greatly to the ease and smoothness of belt harnessing by the occupant. Simplicity, convenience and reliability are further important advantages of the present improved device.

While there has been described and illustrated a preferred embodiment of the present invention, it is apparent that numerous alterations, additions and omissions may be made without departing from the spirit thereof.

I claim:

1. An automatic locking belt carried belt retractor comprising a body member including a rear portion and a front portion having transversely space parallel side walls projecting longitudinally forwardly from said rear portion, a belt take-up reel mounted to said body member rear portion and rotatable in opposite belt extraction and belt retraction directions and spring biased to rotate in a belt retraction direction, a coupling member extending between and movably supported by said body member front portion side walls and restricted to move in a linear longitudinal direction relative to said body member and including a rear section having a transversely extending opening therein with a transverse rear edge, a locking bar extending transversely between said front portion side walls and restricted by said body member in its longitudinal movement relative to said body member and being in overlying registry with said opening and spaced from between said front and rear edges whereby to be longitudinally movable relative to said opening rear edge, and a belt secured to and partly wound on said reel and extending forwardly and below said reel and then upwardly through said opening rearward of said locking bar, forwardly about said locking bar, downwardly through said opening forward of said locking bar and thence rearwardly to a belt anchor point whereby a pull on said coupling member to move said coupling member forwardly relative to said body member effects the contraction between said locking bar and said rear edge to clamp said belt therebetween and release of said coupling member permits the separation of said locking bar and rear edge and the movement of said belt therebetween.

2. The retractor device of claim 1 wherein said body member is of U-shaped configuration including a rear transverse cross arm and transversely spaced longitudinally extending parallel side arms, the front portions of which define said side walls, said reel extending between said side arms forward of said cross arm.

3. The retractor device of claim 1 wherein said side arms have parallel longitudinal track grooves formed in the confronting faces thereof and said coupling member comprises a tongue plate with a rear portion with side edges slidably engaging said track grooves.

4. The retractor device of claim 3 wherein said locking bar slidably rests on said tongue plate adjacent the side ends of said opening.

5. The retractor device of claim 3 wherein said body member includes a top wall extending between the top borders of said side walls and terminating at its forward portion in a depending lip extending to about the top face of said coupling member and lying in the path of said locking bar to restrict the forward movement thereof.

6. The retractor device of claim 5 wherein said top wall terminates at its rear in a depending flange extending between said side walls and to about the level of said coupling member top face.

7. The retractor device of claim 5 wherein said locking bar includes a transversely extending flat main section and forwardly upwardly inclined side legs at opposite ends thereof flanking said belt.

8. The retractor device of claim 1 wherein said body member is formed of a synthetic organic polymeric resin composition.

9. The retractor device of claim 1 including means on said body member limiting the forward movement of said locking bar relative to said body member.

10. The retractor device of claim 1 including means on said body member limiting the rearward movement of said locking bar relative to said body member.

* * * * *